United States Patent [19]

Pappalardo

[11] 4,242,786
[45] Jan. 6, 1981

[54] METHOD OF FORMING AN ASSEMBLED ARTICLE

[75] Inventor: P. Paul Pappalardo, Greenwich, Conn.

[73] Assignee: Greenstate, Inc.

[21] Appl. No.: 965,486

[22] Filed: Dec. 1, 1978

[51] Int. Cl.³ .................... B29C 17/07; B29C 17/08; B29C 27/00
[52] U.S. Cl. .................................. 29/416; 264/527; 264/536; 264/152; 264/156
[58] Field of Search .............. 264/527, 534, 536, 155, 264/156, 154, 152; 29/416, 415

[56] References Cited

U.S. PATENT DOCUMENTS

| | | | |
|---|---|---|---|
| 2,093,909 | 9/1937 | Dodge | 264/156 |
| 2,347,737 | 5/1944 | Fuller | 264/155 |
| 3,292,252 | 12/1966 | Reading | 264/152 X |
| 3,821,344 | 6/1974 | Peters | 264/534 |
| 3,878,283 | 4/1975 | Jones, Sr. | 264/156 X |
| 4,070,430 | 1/1978 | Confer | 264/155 X |

FOREIGN PATENT DOCUMENTS 48-862  1/1973  Japan ....................... 264/156

*Primary Examiner*—Jan H. Silbaugh
*Attorney, Agent, or Firm*—Harness, Dickey & Pierce

[57] ABSTRACT

A method of blow molding a component that is to be assembled from a plurality of pieces to insure that apertures used to secure the pieces together are accurately located and effectively formed. The two pieces to be joined are molded in the same mold cavity and are held in a predetermined longitudinal position relative to each other in the mold cavity and which location corresponds to the assembled location of the pieces. The pieces are simultaneously apertured while the molded plastic is still warm by punches that are affixed to a common actuating member. This insures that the parts will fit well when assembled.

4 Claims, 3 Drawing Figures

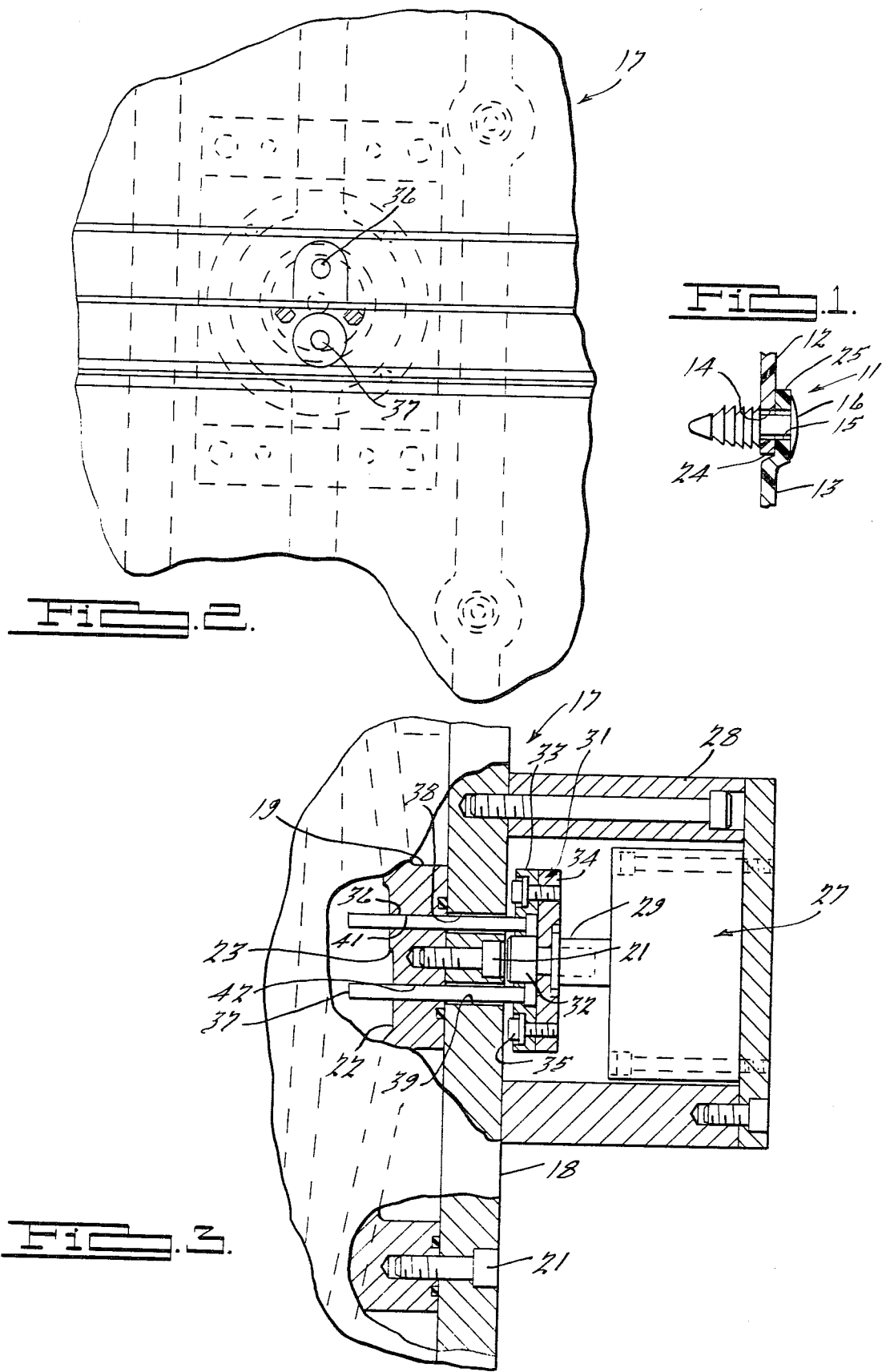

4,242,786

METHOD OF FORMING AN ASSEMBLED ARTICLE

BACKGROUND OF THE INVENTION

This invention relates to a method of forming an aperture part and also to a method of manufacturing an element that is to be made up of a number of parts.

In connection with the forming of parts, particularly by such methods as blow molding, it is often necessary to form apertures in the parts. In connection with many articles it is difficult to accurately locate the aperture once the part is formed into its final shape.

It is, therefore, a first principal object of this invention to provide an improved method for forming and aperturing a part.

It is another object of the invention to provide a method for blow molding and aperturing parts.

In many instances elements are manufactured from a plurality of parts that are connected together. One way in which such parts may be assembled is through the use of fasteners such as rivets and/or bolts which press through apertures in their respective parts. In order to assure a good fit of the final article, the apertures in each part must be accurately located relative to the part in which they are formed and relative to the corresponding aperture in the other part. Although this may be accomplished by means of holding extremely close tolerances, such accurate forming and machining through the use of close tolerances is many times more expensive than justified.

It is, therefore, a further principle object of this invention to provide a method for forming parts that are to be assembled together.

It is a further object of this invention to provide an improved method for accurately locating apertures in each of two parts where the apertures are used to fix the parts together.

SUMMARY OF THE INVENTION

A first feature of this invention is adapted to be embodied in a method of forming an aperture in a part. The method comprises the steps of forcing the part against a mold surface to provide a finished configuration and piercing an aperture in the part when the part is held against the mold surface.

Another feature of this invention is adapted to be embodied in a method for making an article to be assembled from at least two parts. In accordance with this feature, the parts are held relative to each other in a position wherein they are fixed in at least one direction in their final assembled locations. Simultaneously apertures are formed in each of the parts so that the apertures will be aligned in the one direction in their assembled position to receive a male fastening member and secure the parts together.

BRIEF DESCRIPTION OF THE DRAWINGS

FIG. 1 is a partial cross-sectional view taken through the joint of a product made in accordance with this invention and showing the way in which the two parts are secured together.

FIG. 2 is a side elevational view of a portion of a mold used in conjunction with the method of this invention.

FIG. 3 is an end elevational view of the mold shown in FIG. 1, with portions broken away and shown in section.

DETAILED DESCRIPTION OF THE PREFERRED EMBODIMENT

This invention is particularly adapted for use in blow molding articles which are to be assembled together by means of threaded fasteners, rivets or the like. By way of example, FIG. 1 shows one of the connective joints of a finished article that is formed in accordance with the method of this invention. Only that portion of the finished article as is necessary to understand the invention has been illustrated.

The finished article, indicated generally by the reference numeral 11 includes first and second pieces 12 and 13. The pieces 12 and 13 are formed with a number of aligned apertures 14 and 15, respectively (only one set of which appears in the drawings). A fastener, in the form of a plastic rivet 16 is extended through each set of apertures 14, 15 to secure the pieces 12 and 13 together.

It should be readily apparent that the appearance and fit of the finished article 11 depends to a large extent upon the accuracy with which the apertures 14, 15 are formed. The disclosed method relates to an improved, low cost and yet highly effective way of insuring accurate alignment.

In accordance with this invention, the pieces 12 and 13 are simultaneously molded as a single piece in a mold, indicated generally by the reference numeral 17. Again, only that portion of the mold 17 as is necessary to understand the invention has been illustrated and will be described.

The mold 17 is used for blow molding the pieces 12 and 13 from any suitable plastic material used for this purpose. To this end, the mold 17 includes two separate mold halves, only one of which is shown in the drawings. The mold 17 includes an outer member 18 to which an inner member 19 is affixed in any known manner, by means of socket headed screws 21. The inner mold member 19 is formed with a surface 22 which forms the desired configuration of the outer surfaces of the pieces 12 and 13. In accordance with known blow molding techniques, the plastic material to be blow molded is positioned in the cavity defined by the mold surface 22 and is blown into engagement with this surface. Normally, at this time the plastic material will be heated so as to be in a generally fluid, but not liquid state.

In accordance with this invention the pieces 12 and 13 are formed simultaneously as a single piece in the mold 17. The mold surface 22 is formed with a stepped edge 23 which will form the point at which the single molded piece is appropriately severed to form the two pieces 12 and 13. The line along which the single mold piece is cut is represented by the surfaces 24 and 25 in FIG. 1, these surfaces being juxtaposed to the mold step 23.

In order to form the apertures 14 and 15, a pnumatically operated cylinder assembly indicated generally by the reference numeral 27 is supported upon the outer mold piece 18 by means of a supporting arrangement 28. The cylinder 27 has a piston rod 29 that carries at its outer end a punch holder 31. Th punch holder 31 is connected to the piston rod 29 by means of a socket headed screw 32. The punch carrier 31 includes two pieces 33 and 34 that are held together by socket headed screws 35 to support a pair of separate punches 36 and 37. The punches 36 and 37 pass through enlarged apertures 38 and 39 formed in the mold piece 18 and are slideably supported by bores 41 and 42 of the mold piece 19. The drawing shows the punches 36 and 37 in their extended piercing location.

During the initial molding operation, the piston rod 29 is retracted so that the outer edges of the punches 36 and 37 will be substantially flush with the mold surface 22. After the plastic material has been blown into engaged with the mold surface 22 and cooled slightly, the cylinder 27 is actuated so that the punches 36 and 37 will extend through the molded material at a time when pressure is still holding the material into engagement with the mold surface 22. This has been found to provide an extremely clean and accurate hole forming method.

After the punches 36 and 37 have performed their piercing operation, the mold 17 may be opened and the formed material removed. The single mold piece is then severed, as aforenoted to form the two separate pieces 12 and 13. These pieces can then be shipped in a knocked-down condition for eventual assembly by aligning the apertures 14 and 15 and inserting the revet 16. Since the apertures 14 and 15 have been formed simultaneously and while the pieces 12 and 13 formed a single piece in the mold 17, the longitudinal location of the apertures relative to each other will be accurate. Thus, the finished article when assembled will have a good fit without necessitating high accuracies in machining or punching, operations which otherwise would have to be done after the molding operation.

It should be readily apparent from the foregoing description that the disclosed method permits a low cost, but extremely accurate method for forming apertures in pieces which are to be shipped separately and eventually secured together. Various changes and modifications may be made to the described method, which is typical only of a preferred embodiment of the invention, without departing from the spirit and scope of the invention, as defined by the appended claims.

I claim:

1. The method of making an article to be assembled from two pieces having overlapping apertured parts comprising the steps of forming a mold with a surface to generate the shape of the pieces, the mold surface being configured to form the pieces simultaneously and initially being integrally connected together, the mold surface being configured to form the portions of the parts to be aperture aligned in one direction relative to each other and offset relative to each other in non-overlapping relationship in a normal direction, placing a preform in the mold, blow molding the preform into engagement with the mold surface to form a single element, simultaneously piercing apertures in the respective parts of said preform while still held in engagement under pressure with the mold surfaces, removing the element from the mold, severing the element along the abutting edges of the parts and between the pierced apertures of the respective parts to form the separate parts for subsequent assembly, aligning the pierced apertures so that they are superimposed and placing a fastener through the aligned apertures for affixing the pieces together.

2. The method as set forth in claim 1 wherein the preform is heated prior to forcing it against the mold surface.

3. The method as set forth in claim 2 wherein the apertures are formed while the temperature of the preform is still elevated.

4. The method as set forth in claim 1 wherein the mold surface is formed with a step at the juncture of the pieces, the element being severed at the areas engaged with the step in the mold.

* * * * *